Patented Aug. 30, 1949

2,480,649

UNITED STATES PATENT OFFICE 2,480,649

ETHYL HOMOLOG OF VITAMIN B$_6$

Stanton A. Harris, Westfield, and Andrew N. Wilson, Colonia, N. J., assignors to Merck & Co., Inc., Rahway, N. J., a corporation of New Jersey No Drawing. Original application August 27, 1942, Serial No. 456,370. Divided and this application July 20, 1946, Serial No. 685,239

5 Claims. (Cl. 260—297.5)

This invention relates generally to organic chemical compounds and to methods of manufacturing the same; in a more limited sense, it is concerned with a growth-promoting factor related to pyridoxine (vitamin B$_6$) and to processes for producing the same.

The present application is a division of the co-pending application by the same inventors, Serial No. 456,370, filed August 27, 1942.

The present invention involves the synthesis of a novel organic chemical compound, 2-ethyl-3-hydroxy-4,5-bis-(hydroxymethyl)-pyridine, a material which prevents or cures an acrodynia-like dermatitis in young rats and which possesses growth-promoting properties in the metabolism of plants.

The process according to the present invention includes the condensation of cyanoacetamide with 1-methoxy-2,4-hexadione (which can be obtained by reacting methyl ethyl ketone and methyl methoxy acetate), treatment of the 2-ethyl-3-methoxymethyl-5-cyano-6-hydroxypyridine thus obtained with nitric acid, phosphorous halide, and a reducing agent in succession to produce 2-ethyl-3-amino-4-methoxymethyl-5-aminomethyl pyridine, diazotization followed by halogenation of the product, and hydrolysis of the halogen compound to yield 2-ethyl-3-hydroxy-4,5-bis-(hydroxymethyl)pyridine hydrohalide. The reactions involved can be represented as follows:

(which can be obtained by condensing equimolecular proportions of methyl ethyl ketone and methyl methoxyacetate in the presence of sodium at a low temperature) are added with a small amount of piperidine, to about 24.6 g. of cyanoacetamide dissolved in approximately 100 cc. of hot absolute ethanol. After cooling, the precipitated solid mass is removed and washed with ethanol.

Approximately 119 g. of the 2-ethyl-4-methoxymethyl-5-cyano-6-hydroxypyridine thus obtained is suspended in acetic anhydride and about 60.7 cc. of fuming nitric acid is added slowly, while the mixture is vigorously agitated and maintained at a temperature of about 65–70° C. Upon cooling a yellow crystalline solid appears. The solid and liquid are slowly poured into water and the solid, which is the 3-nitro compound, is removed, washed and dried.

About 76 g. of the 3-nitro-compound, 100 g. of phosphorous pentachloride and approximately 320 cc. of dry tetrachloroethane are mixed and heated upon an oil bath. After the reaction has begun, as indicated by evolution of hydrogen chloride, the bath temperature is maintained at 140–145° C. for about two hours, after which the tetrachloroethane and phosphorous oxychloride formed are removed by distillation under reduced pressure at below 70° C. The residue is then dissolved in benzene and poured on crushed ice and, after being maintained at approximately 0° C.

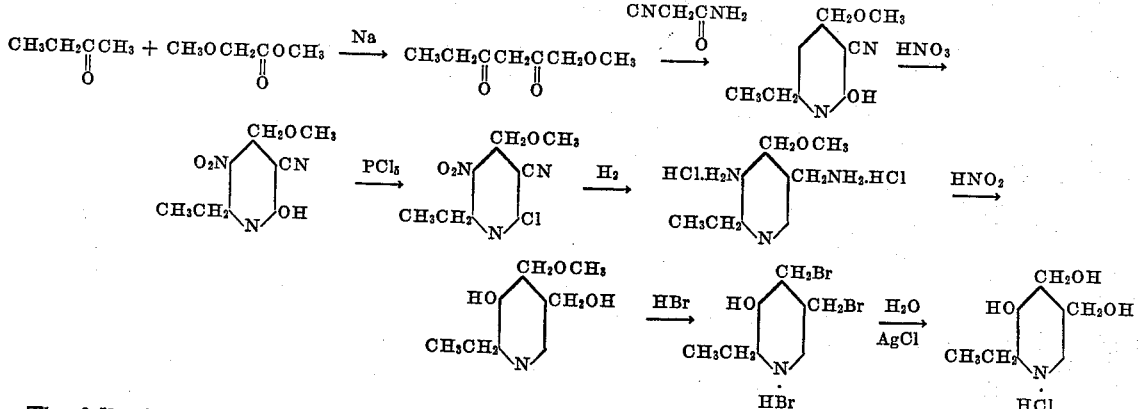

The following example illustrates a method of carrying out the present invention, but it is to be understood that this example is given by way of illustration and not of limitation.

*Example*

About 38.4 g. of 1-methoxy-2,4-hexadione for one hour, a slight excess of ammonia is added. The benzene layer is removed, concentrated under reduced pressure, extracted with petroleum ether and the extract is then cooled, yielding a yellow mass of 2-ethyl-3-nitro-4-methoxymethyl-5-cyano-6-chloropyridine.

The 6-chloro compound thus obtained is reduced in methanol, using palladium black on charcoal as a catalyst, yielding the dihydrochloride of 2-ethyl-3-amino-4-methoxymethyl-5-aminomethyl-pyridine. About 10 g. of the reduced compound are dissolved in hot water, and approximately 6.43 g. of sodium nitrite and 11.3 g. of hydrochloric acid (36%) are added. After cooling and neutralizing, the mixture is concentrated under reduced pressure, extracted with alcohol, dried and further concentrated. The product so obtained is then mixed with about 50 cc. of hydrobromic acid (48%) and heated to boiling, causing evolution of methyl bromide and hydrogen bromide. After concentration followed by cooling, crystalline 2-ethyl-3-hydroxy-4,5-bis-(bromomethyl) pyridine hydrobromide is obtained. About 1.04 g. of this material are dissolved in approximately 100 cc. of water and heated at about 95° C. for approximately 25 minutes, then the solution is filtered, cooled, and shaken with about 2 g. of silver chloride. The solution is then filtered, concentrated almost to dryness at a low temperature, and diluted with acetone, yielding crystalline 2-ethyl-3-hyroxy-4,5-bis-(hydroxymethyl) pyridine hydrochloride, melting at about 191–192° C.

Modifications may be made in carrying out the present invention without departing from the spirit and scope thereof and the invention is to be limited only by the appended claims.

We claim:
1. 2-ethyl-3-hydroxy-4,5-bis-(hydroxymethyl)-pyridine hydrohalide.
2. 2-ethyl-3-hydroxy-4,5-bis-(hydroxymethyl)-pyridine hydrochloride.
3. The process that comprises hydrolyzing 2-ethyl-3-hydroxy-4,5-bis-(halogenmethyl)-pyridine hydrohalide to form 2-ethyl-3-hydroxy-4,5-bis-(hydroxymethyl)-pyridine hydrohalide.
4. The process that comprises heating 2-ethyl-3-hydroxy-4,5-bis-(bromomethyl)-pyridine hydrobromide with water to form 2-ethyl-3-hydroxy-4,5-bis-(hydroxymethyl)-pyridine, reacting the latter solution with silver chloride and recovering 2-ethyl-3-hydroxy-4,5-bis-(hydroxymethyl)-pyridine hydrochloride.
5. The process that comprises heating 2-ethyl-3-hydroxy-4,5-bis(halomethyl)pyridine hydrohalide with water to form 2-ethyl-3-hydroxy-4,5-bis-(hydroxymethyl)pyridine hydrohalide.

STANTON A. HARRIS.
ANDREW N. WILSON.

REFERENCES CITED

The following references are of record in the file of this patent:

Enzymologia VII, 28(XII) 1939, pp. 385–386.